(12) United States Patent
Chou et al.

(10) Patent No.: US 6,240,400 B1
(45) Date of Patent: May 29, 2001

(54) METHOD AND SYSTEM FOR ACCOMMODATING ELECTRONIC COMMERCE IN THE SEMICONDUCTOR MANUFACTURING INDUSTRY

(75) Inventors: Yu-Li Chou; Amit Garg, both of White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/024,526

(22) Filed: Feb. 17, 1998

(51) Int. Cl.[7] ................................................. G06F 17/60
(52) U.S. Cl. ............................ 705/37; 705/1; 705/500
(58) Field of Search ........................... 705/37, 1, 500

(56) References Cited

U.S. PATENT DOCUMENTS

| | | | | |
|---|---|---|---|---|
| 3,573,747 | * | 4/1971 | Adams | 705/37 |
| 4,903,201 | * | 2/1990 | Wagner | 364/408 |
| 5,101,353 | * | 3/1992 | Lupien et al. | 705/37 |
| 5,557,518 | * | 9/1996 | Rosen | 380/24 |
| 5,689,652 | * | 11/1997 | Lupien et al. | 705/37 |
| 5,727,165 | * | 3/1998 | Ordish et al. | 395/237 |
| 5,794,207 | * | 8/1998 | Walker et al. | 705/1 |
| 5,845,266 | * | 12/1998 | Lupien et al. | 705/37 |
| 5,873,071 | * | 2/1999 | Ferstenberg et al. | 705/37 |
| 5,892,900 | * | 4/1999 | Ginter et al. | 713/200 |
| 5,897,621 | * | 4/1999 | Boesch et al. | 705/26 |
| 5,949,876 | * | 9/1999 | Ginter et al. | 705/80 |
| 5,950,177 | * | 9/1999 | Lupien et al. | 705/37 |
| 5,963,923 | * | 10/1999 | Garber | 705/37 |
| 5,970,479 | * | 10/1999 | Shepherd | 705/37 |
| 6,012,046 | * | 1/2000 | Lupien et al. | 705/37 |
| 6,061,789 | * | 5/2000 | Hauser et al. | 713/168 |

OTHER PUBLICATIONS

"AuctioneerSoftware.com Announces Inter–Connex Sell–IT; New Auction Software", Business Wire, Mar. 1999.*

"Ambitious Plan to Build Global eCommerce Trading and Services Platform For The Food Industry Gathers Momentum", PR Newswire, p 1441, Apr. 2000.*

"Southern California Gas allows Users To Solicit Energy Over the Internet", Industrial Energy Bulletin, p. 3, vol. 3, No. 3, Feb. 1999.*

Cavanaugh, Katherine, "Bandwidth's new bargaineers", Technology Review, v. 101, No. 6, pp. 62–5, Nov. 1998.*

* cited by examiner

Primary Examiner—Eric W. Stamber
Assistant Examiner—Akiba Robinson-Boyce
(74) Attorney, Agent, or Firm—McGinn & Gibb, P.C.; Stephen J. Kaufman, Esq.

(57) ABSTRACT

A method for accommodating electronic commerce in a semiconductor manufacturing capacity market. The method comprises the steps of identifying a plurality of players in the semiconductor manufacturing capacity market, each of which players can solicit capacity in semiconductor manufacturing capacity market; providing a neutral third-party, the neutral third party and the plurality of players configured in a hub arrangement for communicating with each of the plurality of players in semiconductor manufacturing capacity trades; and realizing an open market conditionality between each of the plurality of players and the neutral third party so that the semiconductor manufacturing capacity supplied by one or more of the players can be bought and sold among the players; and, the neutral third party can preserve anonymity of each of the plurality of players soliciting semiconductor manufacturing capacity.

29 Claims, 2 Drawing Sheets

METHOD AND SYSTEM FOR ACCOMMODATING ELECTRONIC COMMERCE IN THE SEMICONDUCTOR MANUFACTURING INDUSTRY

BACKGROUND OF THE INVENTION

This invention relates to a method and system for accommodating electronic commerce in the semiconductor manufacturing industry.

INTRODUCTION TO THE INVENTION

Electronic and integrated circuit devices (also known as "chips") are an essential component in the appliance, computer, car, phone, and machine industry. Concomitantly, technological advances in these various industries have increased the electronic content required in the chips. As a result, the industry that manufactures the electronic and integrated circuit devices, the semiconductor manufacturing industry, is experiencing strong growth.

Semiconductor manufacturing is a very capital-intensive industry. The cost of building a wafer fabrication (fab) facility is usually more than $1 billion. Therefore, semiconductor manufacturers want to increase the utilization of their existing facilities. However, fluctuations in demands for chips may result in a mismatch between manufacturing capacity and demand, thereby disadvantageously resulting in excess manufacturing capacity in some companies and a shortage in others. Currently, under such conditions, companies may delay order deliveries or incur very large losses due to idle capacity. These capacity shortages at the fabrication facility can affect manufacturers that use chips as raw materials in their products. Delayed deliveries greatly increase requirements for safety stocks, and can also result in considerable lost sales for a company.

SUMMARY OF THE INVENTION

We have now discovered a novel method and system which can enable semiconductor manufacturers and downstream product manufacturers and users of chips to trade semiconductor manufacturing capacity, thereby creating a situation that can result in benefits for all parties. Some advantages of such a method/system include:

- an efficient utilization of semiconductor manufacturing capacity;
- a preservation of anonymity of the players in this market, and hence a preservation of competitive information a company may not want to divulge;
- a creation of a common marketplace where all the players can trade semiconductor manufacturing capacity simultaneously, thereby obviating one-to-one negotiations and their attendant high search costs;
- a flexibility to change capacity commitments in line with customer demands from time to time.

Accordingly, in a first aspect of the present invention, we disclose a computer implemented method for accommodating electronic commerce in a semiconductor manufacturing capacity market, the method comprising the steps of:

1) identifying a plurality of players in the semiconductor manufacturing capacity market, each of which players can solicit capacity in semiconductor manufacturing capacity market;

2) providing a neutral third-party, the neutral third party and the plurality of players configured in a hub arrangement for communicating with each of the plurality of players in semiconductor manufacturing capacity trades;

and 3) realizing an open market conditionality between each of the plurality of players and the neutral third party so that:
   i) the semiconductor manufacturing capacity supplied by one or more of the players can be bought and sold among the players; and,
   ii) the neutral third party can preserve anonymity of each of the plurality of players soliciting semiconductor manufacturing capacity.

In a second aspect of the present invention, we disclose a system for accommodating electronic commerce in a semiconductor manufacturing capacity market, the system comprising:

1) means for identifying a plurality of players in the semiconductor manufacturing market, each of which players can solicit capacity in the semiconductor manufacturing market;

2) means for providing a neutral third-party, the neutral third party and the plurality of players configured in a hub arrangement for communicating with each of the plurality of players in semiconductor manufacturing capacity trades;

and 3) means for effecting an open market conditionality between each of the plurality of players and the neutral third party so that:
   i) the semiconductor manufacturing capacity supplied by one or more of the players can be bought and sold among the players; and,
   ii) the neutral third party can preserve anonymity of each of the plurality of players soliciting semiconductor manufacturing capacity.

BRIEF DESCRIPTION OF THE DRAWING

The invention is illustrated in the accompanying drawing, in which.

DETAILED DESCRIPTION OF THE INVENTION

In order for this market to work effectively, we first need to elaborate on important subsumed elements including:

Commodity;
Players;
Operational Conditions.

Commodity

Commodity being traded in the present invention comprises capacity in semiconductor manufacturing. Capacity, in turn, may be defined by:

Type of chips, for example DRAM, SRAM, or a certain type of logic chips;
Wafer sizes;
Number of wafer starts;

Set of processes required to produce the wafers;

The time period during which these processes need to be used.

Players

As mentioned earlier, because of technological developments in computer and communications industries, a plurality of players now utilize capacity over the communications networks. These players include:

Semiconductor manufacturers;

Semiconductor design companies;

Manufacturers of products that incorporate chips, including PC manufacturers, communication equipment manufacturers, car manufacturers, various consumer electronic products manufacturers, etc;

Bulk buyers/sellers of semiconductor manufacturing capacity;

Bulk buyers/sellers of semiconductors.

Figure 1:
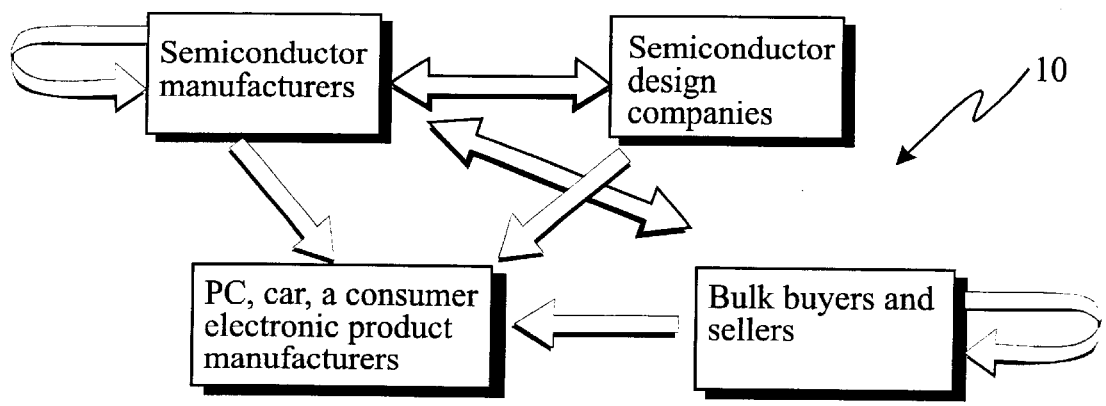
FIG. 1 illustrates relationships among players without an exchange market.

FIG. 1, numeral 10, depicts the current relationship among these players. In this figure an arrow from a first box to a second box indicates that the player in the second box may purchase communication capacity from the player in the first box.

Figure 2:
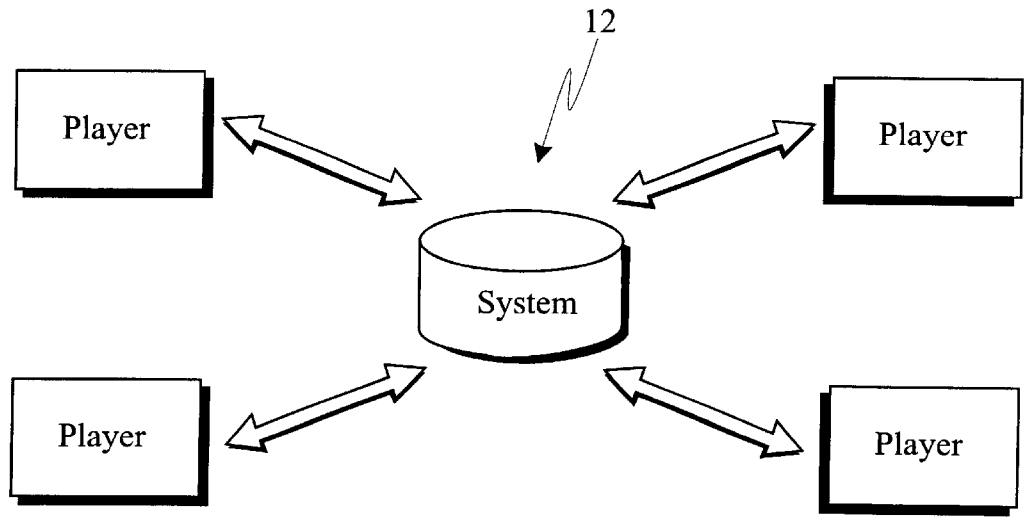
FIG. 2 illustrates players buying and selling capacity, anonymously, in accordance with the present invention.

FIG. 2, numeral 12, shows the market dynamics when trading can be done through the present invention.

Operational Conditions

Figure 3:
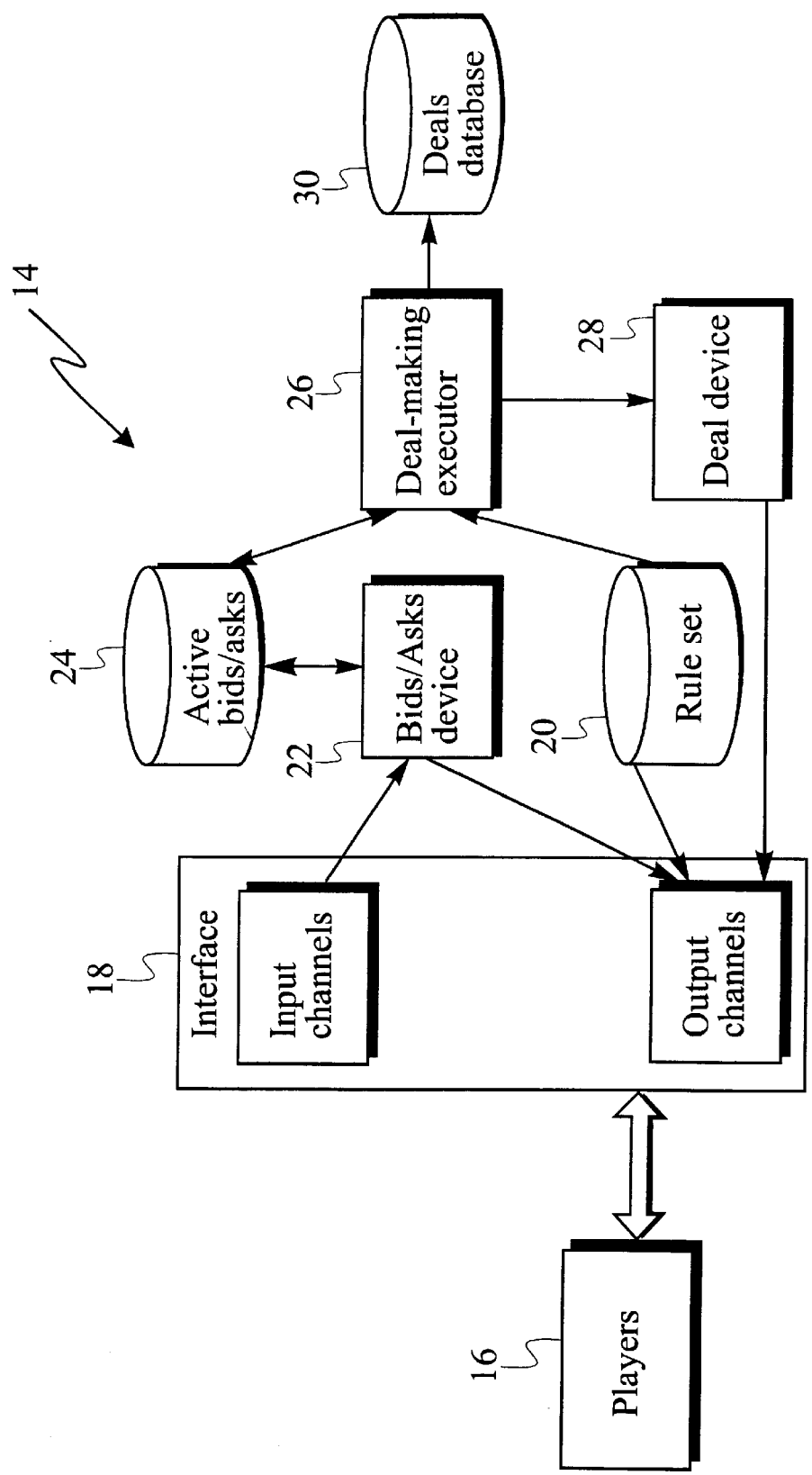
FIG. 3 shows an operational architecture of a system of the present invention.

We now turn our attention to FIG. 3, which depicts an operational architecture of the present invention system 14 where players 16 can interact through an interface 18 comprising input and output channels. This operational architecture comprises the following components:

Interface 18: the interface includes input and output channels.

Input channels: the input channels enable players to submit to the system 14 their offers (asks) and/or requests (bids) for desired quantity of a commodity, their identities, and whether or not they want their identities revealed. These channels include, for example, internet, telephone, EDI, and e-mail. The possible set of input channels should be clearly identified in the market rules.(see below)

Output channels: Output channels include the means of confirming the execution of trades placed by the players. These output channels could be Internet, e-mails, phone calls, etc. Players who are a party to the executed deals can receive detailed information of relevant terms (e.g., prices and allocated commodity). The complete set of possible output channels should be clearly stated in the market rules. (see below)

Set of rules 20: the rules preferably include security-related issues, legal requirements for all potential players (e.g., payments and deal execution requirements, etc.), a deal-making mechanism (e.g., an auction mechanism), and methods and requirements for submitting offers/requests. The rules should be clearly stated to all players and strictly followed. (Note that more than one type of deal-making mechanism is possible. However, different mechanisms may result in different market efficiencies—capacity utilization and commodity valuation.)

Bids/Asks device 22: The bids/asks device 22 can validate bids and/or asks submitted by players through input channels. If a bid or an ask is invalid, the device can inform relevant players through the output channels. Otherwise, the device can store the bid or ask in the active bids/asks database. The device can provide players with information specified within the set of rules through the output channels. For example, this information can include the price at which the last deal for that commodity was executed.

Active bids/asks database 24: This database maintains a list of valid unexecuted bids and asks for each commodity.

Deal-making executor 26: The deal-making executor 26 preferably takes all the valid (unexecuted) bids and asks submitted by players and finds feasible matched deals according to the procedures stated in the rule set. Outcomes are a set of contracts, which include commodity allocations and prices.

Deal device 28: The deal device 28 can receive information on deals executed from the deal-making executor. This device can inform buyers and sellers if their bids and asks respectively were executed. If a buyer or a seller wishes to remain anonymous, the device will not make their identities known to the public.

Deals database 30: The deals database 30 preferably maintains a record of all trades executed by the deal-making executor.

What is claimed:

1. A computer implemented method for accommodating electronic commerce in a semiconductor manufacturing capacity market, the method comprising:

1) identifying a plurality of players in the semiconductor manufacturing capacity market, each of which players can solicit capacity in semiconductor manufacturing capacity market, 2) providing a neutral third-party, the neutral third party and the plurality of players configured in a hub arrangement for communicating with each of the plurality of players in semiconductor manufacturing capacity trades; and 3) realizing an open market conditionality between each of the plurality of players and the neutral third party so that:

i) the semiconductor manufacturing capacity supplied by one or more of the players can be bought and sold among the players; and ii) each of the players may individually select at any time during said market conditionality, one of the following regardless of selection of the other players: identifying themselves to the other players and preserving their anonymity among each of the plurality of players soliciting semiconductor manufacturing capacity.

2. A method according to claim 1, wherein said plurality of players is selected from a group consisting of semiconductor manufacturers, semiconductor design companies, semiconductor manufacturing capacity bulk buyers and sellers, bulk buyers and sellers of semiconductors, and manufacturers of products that incorporate semiconductor chips.

3. A method according to claim 1, wherein a solicit comprises ascertaining a market price of the semiconductor manufacturing capacity.

4. A method according to claim 1, wherein a solicit comprises specifying the availability of the semiconductor manufacturing capacity.

5. A method according to claim 1, wherein said semiconductor manufacturing capacity comprises specifying attributes of said semiconductor manufacturing capacity including a type of semiconductor, a size of wafer, a number of wafer starts, a set of processes required for manufacturing these wafers, and a time period during which these processes need to be used.

6. A method according to claim 1, wherein preserving anonymity by the neutral third party comprises the neutral third party not revealing a player's identity to anyone.

7. A method according to claim 4, wherein specifying available semiconductor manufacturing capacity comprises connotating a price at which any of said plurality of players is willing to buy.

8. A method according to claim 4, wherein specifying available semiconductor manufacturing capacity comprises connotating a price at which any of said plurality of players is willing to sell.

9. A system for accommodating electronic commerce in a semiconductor manufacturing capacity market, the system comprising:
1) means for identifying a plurality of players in the semiconductor manufacturing market, each of which players can solicit capacity in the semiconductor manufacturing market;
2) means for providing a neutral third-party, the neutral third party and the plurality of players configured in a hub arrangement for communicating with each of the plurality of players in semiconductor manufacturing capacity trades; and
3) means for effecting an open market conditionality between each of the plurality of players and the neutral third party so that:
    i. the semiconductor manufacturing capacity supplied by one or more of the players can be bought and sold among the players; and,
    ii. each of the players may individually select at any time during said open market conditionality one of the following regardless of selections of the other players: identifying themselves to the other players and preserving anonymity of each of the plurality of players soliciting semiconductor manufacturing capacity.

10. A system according to claim 9, wherein the means for providing the neutral third-party comprises:
1) a set of input channels for effecting an interface between the players and the neutral third-party;
2) a rules device for coordinating trades among the players through the neutral third-party using a set of rules, said set of rules including one of requirements for said players and deal-making mechanisms;
3) a bids/asks device for receiving information from the input channels, validating and storing information;
4) an active bids/asks database for storing said information including a set of valid active bids and asks for each commodity;
5) an executor receiving inputs from the rules device, retrieving inputs from and updating the active bids/asks database, and having the capability to execute a trade;
6) a deal device receiving inputs from the executor and outputting results of trades to the players via an output channel;
7) a deals database receiving and storing inputs from the executor; and
8) a set of output channels for effecting an interface between the players and the neutral third-party.

11. A system according to claim 10, wherein the input channel comprises an internet.

12. A system according to claim 10, wherein the input channel comprises a telephone.

13. A system according to claim 10, wherein the input channel comprises an electronic data interchange (EDI).

14. A system according to claim 10, wherein the input channel comprises an electronic mail.

15. A system according to claim 10, wherein the rule device comprises means for establishing conditions for effecting trades.

16. A system according the claim 15, wherein the conditions comprise at least one of legal requirements, financial requirements, security requirements, deal-making mechanism, and mechanism submitting bid and ask orders.

17. A system according to claim 10, wherein the bids/asks device comprises means for collecting unexecuted buy and sell orders for capacity in semiconductor manufacturing, validating buy and sell orders according to the set of rules, storing valid orders in said active bids/asks database, and outputting information to players through a set of output channels.

18. A system according to claim 10, wherein the active bids/asks database comprises means for storing valid unexecuted buy and sell orders.

19. A system according to claim 10, wherein the executor comprises means for executing a trade by interpreting rules from the rules device to match unexecuted buy and sell orders stored in the active bids/asks database, and means for updating the active bids/asks database and said deals database.

20. A system according to claim 19, wherein the trade is an outcome from the executor and comprises price, allocation of the semiconductor manufacturing capacity, and the players involved.

21. A system according to claim 10, wherein the deal device comprises means for collecting the trades executed by the executor, outputting relevant trade information to the players through the output channel.

22. A system according to claim 21, wherein relevant trade information comprises a confirmation to the player if their buy order was executed, the price at which semiconductor manufacturing capacity was bought, and the quantity purchased.

23. A system according to claim 21 wherein relevant trade information comprises a confirmation to the player if their sell order was executed, the price at which semiconductor manufacturing capacity was sold, and the quantity sold.

24. A system according to claim 10, wherein the deals database comprises means for storing executed trades.

25. A system according to claim 10, wherein the output channel comprises an internet.

26. A system according to claim 10, wherein the output channel comprises a telephone.

27. A system according to claim 10, wherein the output channel comprises an electronic data interchange (EDI).

28. A system according to claim 10, wherein the output channel comprises electronic mail.

29. A computer implemented method for accommodating electronic commerce in a semiconductor manufacturing capacity market, the method comprising:
1) identifying a plurality of players in the semiconductor manufacturing capacity market, each of which players can solicit capacity in semiconductor manufacturing capacity market,
2) providing a neutral third-party, the neutral third party and the plurality of players configured in a hub arrangement for communicating with each of the plurality of players in semiconductor manufacturing capacity trades; and 3) realizing an open market conditionality between each of the plurality of players and the neutral third party so that:
   i) the semiconductor manufacturing capacity supplied by one or more of the players can be bought and sold among the players; and
   ii) each of the players may individually select if and at what time during said market conditionality to identify themselves to the other players soliciting semiconductor manufacturing capacity.

* * * * *